United States Patent
Voit et al.

(10) Patent No.: US 10,397,127 B2
(45) Date of Patent: Aug. 27, 2019

(54) PRIORITIZED DE-QUEUEING

(71) Applicant: CISCO TECHNOLOGY, INC., San Jose, CA (US)

(72) Inventors: Eric A. Voit, Bethesda, MD (US); Einar Nilsen-Nygaard, Kilmarnock (GB)

(73) Assignee: Cisco Technology, Inc., San Jose, CA (US)

( * ) Notice: Subject to any disclaimer, the term of this patent is extended or adjusted under 35 U.S.C. 154(b) by 43 days.

(21) Appl. No.: 15/654,927

(22) Filed: Jul. 20, 2017

(65) Prior Publication Data
US 2019/0028399 A1    Jan. 24, 2019

(51) Int. Cl.
| | | |
|---|---|---|
| *H04L 12/861* | (2013.01) | |
| *H04L 12/863* | (2013.01) | |
| *H04L 12/865* | (2013.01) | |
| *G06F 13/38* | (2006.01) | |
| *H04L 12/927* | (2013.01) | |

(52) U.S. Cl.
CPC ...... *H04L 47/6295* (2013.01); *H04L 47/6275* (2013.01); *H04L 49/90* (2013.01); *G06F 13/382* (2013.01); *H04L 47/805* (2013.01)

(58) Field of Classification Search
CPC ... H04L 67/1097; H04L 69/16; H04L 69/161; H04L 69/10; H04L 69/165; H04L 49/90; H04L 67/2861; H04L 47/10; H04L 49/205
See application file for complete search history.

(56) References Cited

U.S. PATENT DOCUMENTS

| | | | | |
|---|---|---|---|---|
| 2003/0198204 A1* | 10/2003 | Taneja | ...................... | H04L 5/023 370/332 |
| 2007/0268903 A1* | 11/2007 | Nakagawa | ............ | H04L 45/745 370/392 |
| 2013/0275637 A1* | 10/2013 | Gomes | ...................... | G06F 13/24 710/263 |
| 2015/0242307 A1* | 8/2015 | Busaba | ................... | G06F 9/528 711/165 |
| 2015/0326650 A1* | 11/2015 | Yang | ...................... | G06F 9/5011 709/226 |

OTHER PUBLICATIONS

M. Belshe, et al., "Hypertext Transfer Protocol Version 2 (HTTP/2)", Internet Engineering Task Force (IETF), ISSN: 2070-1721, RFC 7540, May 2015, 96 pages.
"Telemetry Configuration Guide for Cisco NCS 5500 Series Routers, IOS XR Release 6.2.x", https://www.cisco.com/c/en/us/td/docs/iosxr/ncs5500/telemetry/b-telemetry-cg-ncs5500-62x.html, Dec. 23, 2015, 42 pages.
E. Voit, et al., "Restconf and HTTP Transport for Event Notifications", draft-ietf-netconf-restconf-notif-02, NETCONF, Internet-Draft, Mar. 13, 2017, 17 pages.
"DSCP based bucketing and QoS mechanisms", https://www.cisco.com/c/dam/en/us/td//200001-300000/220001-230000/228001-229000/228984.eps/_jcr_content/renditions/228984.jpg, retrieved from the internet on Mar. 19, 2019, 1 page.

* cited by examiner

*Primary Examiner* — Sai Aung

(57) ABSTRACT

A method is provided in one example and includes allocating a first queue, allocating at least two default queues, where the at least two default queues depend from the first queue, allocating a plurality of local queues that each depend from one of the at least two defaults queues, receiving data in a data stream, determining a quality of service (QoS) associated with the data, and assigning the data to one of the plurality of local queues based on the determined QoS. In an example, the QoS is a differentiated services code point.

20 Claims, 6 Drawing Sheets

120g

| QUEUE (130) | QoS IDENTIFIER (132) | DEPENDENT ON QUEUE (134) | QUEUE WEIGHT (136) |
|---|---|---|---|
| Q-5 |  | - |  |
| Q-13 | A | Q-5 | 80 |
| Q-15 | B | Q-5 | 9 |
| Q-17 | C | Q-5 | 10 |
| Q-19 | D | Q-5 | 1 |
| Q-21 | A | Q-13 |  |
| Q-23 | B | Q-15 |  |
| Q-25 | B | Q-15 |  |
| Q-27 | B | Q-15 |  |
| Q-29 | C | Q-17 |  |
| Q-31 | 00 | Q-17 |  |
| Q-32 | C-D1 | Q-29 |  |
| ○○○ | ○○○ | ○○○ | ○○○ |

122a — GLOBAL QUEUE TABLE

124g — LOCAL QUEUE TABLE

FIG. 2

| DSCP | TREATMENT EQUIVALENCY | RESERVED QUEUE | DEPENDENT ON QUEUE | QUEUE WEIGHT |
|---|---|---|---|---|
|  | ALL SUBSCRIPTIONS | Q-5 | - | - |
| 24 | SIGNALING | Q-13 | Q-5 | 100 |
| 18 | TRANSACTIONAL | Q-15 | Q-5 | 9 |
| 0 | BEST EFFORT | Q-17 | Q-5 | 10 |
| 8 | SCAVENGER | Q-19 | Q-5 | 1 |

| SUBSCRIPTION ID | DSCP | ALLOCATED QUEUE | DEPENDENT ON QUEUE | DEPENDENT QUEUE WEIGHT | RESULTING BANDWIDTH |
|---|---|---|---|---|---|
| 5000 | 0 | Q-101 | Q-17 | 10 | 25% |
| 5001 | 0 | Q-103 | Q-17 | 10 | 25% |
| 5002 | 18 | Q-105 | Q-15 | - | 45% |
| 5003 | 0 | Q-107 | Q-103 | - | 0% (OR 25% WHEN 103 IS EMPTY) |
| 5004 | 8 | Q-109 | Q-19 | - | 5% |

PRIORITIZED DE-QUEUEING

TECHNICAL FIELD

This disclosure relates in general to the field of communications and/or networking and, more particularly, to prioritized de-queueing.

BACKGROUND

End users have more communications choices than ever before. A number of prominent technological trends are currently afoot (e.g., more computing devices, more online video services, more Internet video traffic), and these trends are changing the network delivery landscape. On change is that networking architectures have grown increasingly complex in communication environments. As the number of end users increases and/or becomes mobile, efficient management and proper routing of data and data flows becomes critical.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2 is a simplified block diagram of a table for use in a communication system to allow for prioritized de-queueing in accordance with one embodiment of the present disclosure;

The FIGURES of the drawings are not necessarily drawn to scale, as their dimensions can be varied considerably without departing from the scope of the present disclosure.

DETAILED DESCRIPTION

Example Embodiments

The following detailed description sets forth example embodiments of apparatuses, methods, and systems relating to a system for enabling prioritized de-queueing. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the following detailed description, reference is made to the accompanying drawings that form a part hereof where like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Figure 1:
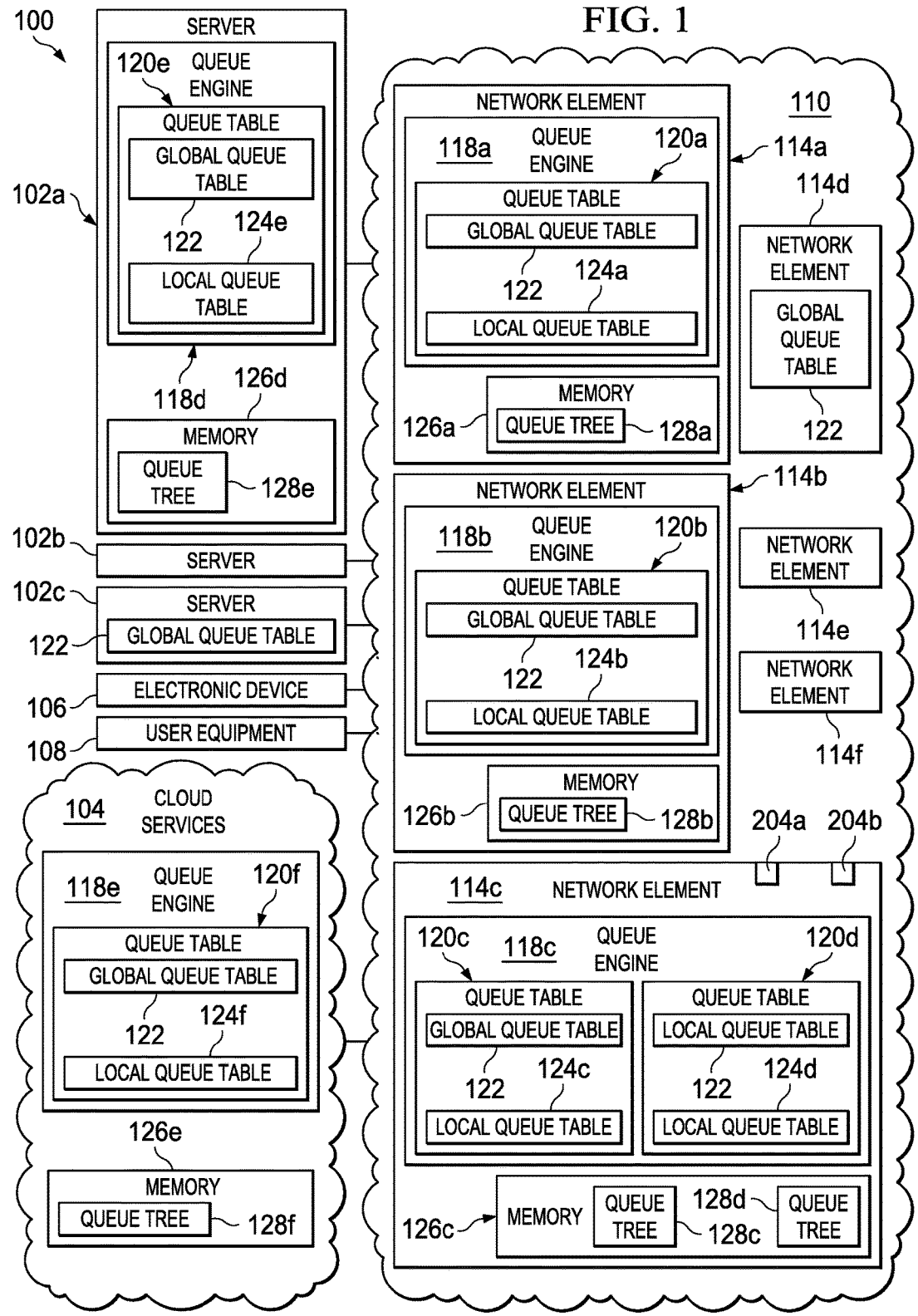
FIG. 1 is a simplified block diagram of a communication system for prioritized de-queueing in accordance with one embodiment of the present disclosure.

FIG. 1 is a simplified block diagram of a communication system 100 to allow for prioritized de-queueing. Communication system 100 can include one or more servers 102a-102c, cloud services 104, one or more electronic devices 106, and one or more user equipment 108. Servers 102a-102c, cloud services 104, electronic device 106, user equipment 108, and network elements 114a-114f can be in communication using network 110.

Each network element 114a-114f can include a queue engine. For example, network element 114a can include a queue engine 118a and memory 126a, network element 114b can include a queue engine 118b and memory 126b, and network element 114c can include a queue engine 118c and memory 126c. In an example, one or more servers 102a-102c can include a queue engine. For example, server 102a can include a queue engine 118d and memory 126d. In another example, cloud services 104 can include a queue engine 118e and memory 126e.

Each queue engine 118a-118e can include one or more queue tables 120a-120e respectively. In an example, each queue table 120a-120e can correspond to an interface. More specifically, network element 114c can include interfaces 204a and 204b. Queue table 120c can correspond to interface 204a and queue table 120d can correspond to interface 204b.

Each queue table 120a-120e can include a global queue table 122 and a local queue table 124a-124e respectively. In an example, one or more network elements 114a-114e can include global queue table 122. For example, network element 114d can include global queue table 122 and not a queue table or local queue table. In another example, one or more servers 102a-102c can include global queue table 122 and not a queue table or local queue table. For example, server 102c can include global queue table 122 and not a queue table or local queue table.

Memory 126a in network element 114a can include a queue tree 128a. Memory 126b in network element 114b can include a queue tree 128b. Memory 126c in network element 114c can include a queue tree 128c and a queue tree 128d. Memory 126d in server 102a can include a queue tree 128e. Memory 126e in cloud services 104 can include a queue tree 128f. Each queue tree 128a-128f can correspond to queue tables 120a-120f respectively. Queue trees 128a-128f can each include a hierarchy or tree of queues that have different levels of priority and allow for de-queueing of data based on a QoS identifier, differentiated services code point (DSCP), or some other identifier associated with the data that can indicate priority levels.

In an example, each network element 114a-114f can help facilitate the communication of data with different priority levels between servers 102a-102c, cloud services 104, electronic device 106, and user equipment 108. To provide proper communication of the data, queue engines 118a-118e can help ensure that the data is properly de-queued. In addition, bandwidth can be allocated for different priority levels within different traffic classes and the data can be proportionally de-queued based on different priority levels within each traffic class. The system can be fully automated and can work in conjunction with existing data traffic and quality of service (QoS) mechanisms.

Each queue tree 128a-128d can each include a set of default queues (e.g., global tree) and dependent queues (e.g., local tree). As new types of data stream are received, each new type of data stream can be automatically assigned to a dependent queue or a new dependent queue can be created. A newly created dependent queue and relationship of the newly created dependent queue to other dependent queues does not need to be created manually. For each interface (e.g., interface 204a and 204b), the dependent queues are automatically based on the QoS identifier associated with received data or the DSCP associated with subscriptions without any touch or required actions by an administrator. In an example, queue engine 118d can help to manage data traffic in server 102a and queue engine 118e help to manage data traffic in cloud services 104.

A portion of each queue tree 128a-128e can be defined by global queue table 122. The rest of each queue tree 128a-128e can be at least partially defined by each of local queue tables 124a-124e respectively and is created when data is received or sent. Local queue tables 124a-124f are built or created as data is received at each interface for server 102a, cloud services 104, and network element 114a-114c and each of local queue tables 124a-124f can be a unique local queue table. Because each server 102a, cloud services 104, network element 114a-114c, and interfaces 204a and 204b can sent and receive different types of data, the queue tree associated with each of server 102a, cloud services 104, network element 114a-114c, and interfaces 204a and 204b can be different. For example, in network element 114a, queue tree 128a can include a portion based on global queue table 122 and a portion based on local queue table 124a while in network element 114b, queue tree 128b can include a portion based on global queue table 122 and a portion based on local queue table 124b. The portion of queue tree 128a and 128b that is based on global queue table 122 can be the same, however, the portion of queue tree 128a based on local queue table 124a may be different from the portion of queue tree 128b based on local queue table 124b.

Global queue table 122 is pre-configured by an administrator and can be pre-loaded on a device or when connections are established to the device, global queue table 122 can be downloaded from another device. For example, global queue table 122 may be pre-loaded onto network element 114a but not on network element 114b. When a network connection is established between network element 114b and some other device (e.g., server 102a, cloud services 104, network element 114e, etc.), global queue table 122 can be acquired or downloaded from server 102a or 102c, network element 114a, or some other device that can communicate global queue table 122 to network element 114b.

For purposes of illustrating certain example techniques of communication system 100, it is important to understand how typical communications may traverse the network. The following foundational information may be viewed as a basis from which the present disclosure may be properly explained.

Networking architectures continue to grow increasingly complex in communication environments. As the number of end users increases and/or becomes mobile, efficient management and proper routing of data flows becomes critical. One particular type of data where efficient management is crucial is telemetry data. Generally, telemetry is an automated communications process by which data is collected at one node or device and transmitted across a network to another node or device. Although the term commonly refers to wireless data transfer mechanisms (e.g., using radio, ultrasonic, or infrared systems), it also encompasses data transferred over other media such as a computer network, optical link, or other wired communications.

Streaming telemetry allows a relatively large amount of data to be pushed from one device to another. One type of steaming telemetry is sending as much data as fast as possible to a server. Another type of steaming telemetry is to send custom streams to multiple destinations or clients. In both types, there is a relatively large amount of data being transmitted across a network. Most of the data is related to events that happen very frequently and often (e.g., flow records). When something happens infrequently and is considered critical data (e.g., an interface going down, access control list (ACL) changes, changing software keys or cryptography keys, etc.), it is necessary to ensure that the critical data, the data that happens infrequently, goes in front of the non-critical data that occurs frequently.

One issue with having the relatively large amount of traffic is that critical or important data can be stuck behind or delayed by non-critical data. For example, security notifications need to be prioritized over flow records or general counter information. However, with some current systems, it can be difficult to ensure that the critical data goes before or is prioritized over the non-critical data. What is needed is a system to help ensure that the critical data is prioritized over the non-critical data.

A communication system, as outlined in FIG. 1, can resolve these issues (and others). Communication system 100 can be configured to provide a system to allow for prioritized de-queueing. In an example, communication system 100 can allow for different priority levels and traffic classifications and ensure that de-queuing and prioritization occur automatically against the different types of traffic classes that are being communicated across a network. Once running, the de-queueing can be automatically configured without any administrator intervention or requirement for the administrator to do system configurations. Communication system 100 allows for the ability to ensure that with a mix of traffic, the right information or right type of data is prioritized when it is being communicated on a shared interface with other information.

More specifically, communication system 100 can be configured to automatically build a tree of dependencies. With the tree of dependencies, as new data in the network traffic is received, the system can determine into what group the new data falls and allow the dependences to build themselves so there is a somewhat automatic creation of dependencies between the data streams and the creation of default queues that allow the different classes of information and types of information to be prioritized across the different types of data.

In an example, communication system 100 can be configured to recognize a QoS identifier associated with data in network traffic, where different QoS identifiers have different priorities. Based on the QoS identifier, the data can be automatically de-queued according to the priority of the data.

In a specific example, communication system 100 can allocate bandwidth for different traffic classes of telemetry data and/or feeds and proportionally de-queue each telemetry data and/or feed within a traffic class. This allows a queue with one type of data associated with a QoS identifier to be completely emptied while at the same time data associated with another QoS is also being sent from another queue. More specifically, a queue with critical data may occupy a majority of the bandwidth while non-critical data in another queue may take up a small portion of the bandwidth.

One feature of telemetry is the use of subscriptions, however, subscriptions are not limited to model driven telemetry. Some existing router and switches need to be asked or queried to obtain data. This causes latency, verbosity, and increased traffic on the network. With an on-change subscription, data can be pushed when changes happen which improves the reaction time of notification of the change and can cause a decrease in the amount of traffic on the network. With a periodic subscription, data is pushed every few seconds. Communication system 100 can allow both on change and periodic subscriptions to be prioritized based on their updates to help ensure the right data is quickly communicated across the network. In addition, communication system 100 can allow for a fully automated configuration and the ability to work in conjunction with other non-telemetry traffic. Also, communication system 100 can work in concert with existing QoS mechanisms on a brown-field network with a minimal amount of extra configuration.

In a specific example, each queue engine 118a-118e can be configured to allocate an HTTP2 local reserved queue for all subscriptions. As data is received, each queue engine 118a-118e can be configured to determine if a subscription in an HTTP2 subscription that includes a DSCP or has a dependency such that streaming updates from a different subscription should explicitly go first. For each new subscription, each queue engine 118a-118e can be configured to determine if a DSCP value on the subscription has not been previously received. If the DSCP value on the subscription has not been previously received, a new local reserved queue can be allocated and the new allocated local reserved queue can be made dependent on an existing queue in the queue tree. The corresponding local queue table can be updated and a subscription weight can be stored if one exists. In an example, the weight for each DSCP value can be reallocated. If there is a subscription dependency, an HTTP2 queue dependency can be placed on a parent subscription's queue in the corresponding local queue table. Otherwise the subscription dependency can be assigned to the reserved queue for that DSCP.

Each queue table 120a-120f can be configured to include a level of reserved queues so that non-subscription traffic can be explicitly shared/balanced/prioritized with other traffic. Each queue engine 118a-118e can be configured to utilize weight random early detection (WRED) or some other dequeuing method so that full streams of push updates are dropped and there is not intermittent packet loss across all the data streams. Communication system 100 can be configured to allow for auto QoS configuration, proportional balancing, and explicit dependencies for telemetry object flows. Each queue engine 118a-118e can be configured to define how to match object flows into underlying HTTP2 and GRPC stream QoS and de-queuing treatments. As a result, communication system 100 only needs to define DSCP on a subscription, and optionally a proportional bandwidth weighting for each DSCP class, while everything else auto-configures. This ensures deterministic treatment across all subscriptions and effectively provides one queue per subscription. Communication system 100 is compatible with existing QoS markings/mechanisms for existing internet protocol (IP) backbones. The above examples are only illustrative examples and other means or methods may be used to the context of or to allow for prioritized de-queueing.

Turning to the infrastructure of FIG. 1, communication system 100 in accordance with an example embodiment is shown. Generally, communication system 100 can be implemented in any type or topology of networks. Network 110 represents a series of points or nodes of interconnected communication paths for receiving and transmitting packets of information that propagate through communication system 100. Network 110 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication. Network 110 can include any number of hardware or software elements coupled to (and in communication with) each other through a communications medium.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication systems 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, servers 102a-102c, cloud services 104, and network elements 114a-114f, are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

As used herein in this Specification, the term 'network element' is meant to encompass any of the aforementioned elements, as well as servers (physical or virtually implemented on physical hardware), machines (physical or virtually implemented on physical hardware), end-user devices, routers, switches, cable boxes, gateways, bridges, load-balancers, firewalls, inline service nodes, proxies, processors, modules, or any other suitable device, component, element, module, proprietary appliance, or object operable to exchange, receive, and transmit information in a network environment. These network elements may include any suitable hardware, software, components, modules, interfaces, or objects that facilitate the synonymous labels operations thereof. This may be inclusive of appropriate algorithms and communication protocols that allow for determining analytics related to a network.

In one implementation, network elements implementing the prioritized de-queueing features described herein may include software to achieve (or to foster) the functions discussed herein for providing and processing when the software is executed on one or more processors to carry out the functions. This could include the implementation of instances of modules (e.g., queue engine 118) and/or any other suitable element that would foster the activities discussed herein. Additionally, each of these elements can have an internal structure (e.g., a processor, a memory element, etc.) to facilitate some of the operations described herein. In other embodiments, these functions for prioritized de-queueing may be executed externally to these elements, or included in some other network element to achieve the intended functionality. Alternatively, network elements may include software (or reciprocating software) that can coordinate with other network elements in order to achieve determination of analytics related to a network described herein. In still other embodiments, one or several devices may include any suitable algorithms, hardware, software, components, modules, interfaces, or objects that facilitate the operations thereof.

In regards to the internal structure associated with communication system 100, servers 102a-102c, cloud services 104, and network elements 114a-114f can each include memory elements for storing information to be used in the operations outlined herein. Each of servers 102a-102c, cloud services 104, and network elements 114a-114f may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the prioritized de-queueing functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory machine-readable media. In some of these instances, memory elements can store data used for the operations described herein. This includes the memory elements being able to store software, logic, code, or processor instructions that are executed to carry out the activities described herein. In some of these instances, one or more memory elements can store data used for the operations described herein. This includes the memory element being able to store instructions (e.g., software, code, etc.) that are executed to carry out the activities described in this Specification. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an EEPROM) or an ASIC that includes digital logic, software, code, electronic instructions, or any suitable combination thereof.

Any of these elements (e.g., the network elements, etc.) can include memory elements for storing information to be used in achieving the prioritized de-queueing functions, as outlined herein. Additionally, each of these devices may include a processor that can execute software or an algorithm to perform the functions of prioritized de-queueing as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

In an example implementation, network elements of communication system 100 may include software modules (e.g., queue engine 118) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, servers 102a-102c, cloud services 104, and network elements 114a-114f each may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a FPGA, an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Servers 102a-102c can be a network element such as a physical server or virtual server and can be associated with clients, customers, endpoints, or end users wishing to initiate a communication in communication system 100 via some network (e.g., network 110). The term 'server' is inclusive of devices used to serve the requests of clients and/or perform some computational task on behalf of clients within communication systems 100. Cloud services 104 may generally be defined as the use of computing resources that are delivered as a service over a network, such as the Internet. The services may be distributed and separated to provide required support for electronic devices. Typically, compute, storage, and network resources are offered in a cloud infrastructure, effectively shifting the workload from a local network to the cloud network. Electronic devices 106 and user equipment 108 can include user devices.

Turning to FIG. 2, FIG. 2 is a simplified block diagram of a queue table 120g for use in a communication system to allow for prioritized de-queueing in accordance with one embodiment of the present disclosure. Queue table 120g can include global queue table 122a and local queue table 124g. Queue table 120g can include a queue column 130, a QoS identifier column 132, a dependent column 134, and a queue weight column 136.

Queue column 130 can include an identifier identifying reserved queues in a queue tree (e.g., queue tree 128). QoS identifier column 132 can include a list of QoS identifiers. Queue table 120g indicates what queue is associated with the QoS identifier. For example, if data is received with a QoS identifier of A, then queue table 120 indicates that the data is to be sent to queue Q-21. Q-17 can be a default, best effort, or "catch all" queue that is associated with data that does not have a QoS identifier or a QoS identifier that indicates the data is to be sent to the default, best effort, or "catch all" queue (e.g., Q-31 has a QoS identifier of "00" indicating that data with a QoS identifier of "00" is to be sent to the best effort queue). In an example, a QoS identifier can indicate that data is to be sent to a queue other than a global queue. For example, data with a QoS identifier "C-D1" can be assigned to Q-32, which is dependent on Q-29, which is dependent on Q-17.

Dependent column 134 indicates the queue a specific queue is dependent on in the queue tree. For example, queues Q-13, Q-15, Q-17, and Q-19 are dependent on queue Q-5. Queue Q-5 is at the top of the queue tree and there is not dependent on another queue. Queue weight column 136 indicates the queue weight assigned to each queue. For example, queue Q-13 has a queue weight of 80 and queue Q-19 has a queue weigh of 1. As illustrated in FIG. 2, the queue weight indicates that the data in queue Q-13 has a higher level of priority than the data in queue Q-19 and the data in queue Q-13 will be de-queued at a faster rate or higher priority than the data in queue Q-19.

Figures 3, 4:
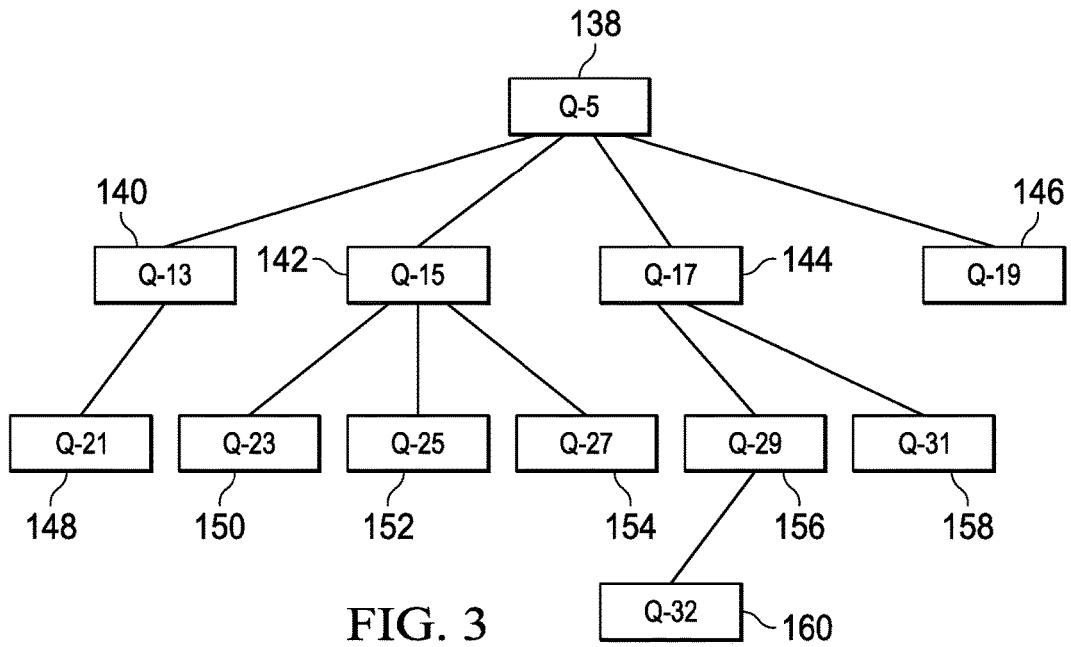
FIG. 3 is a simplified tree diagram illustrating example details associated with a communication system to allow for prioritized de-queueing in accordance with one embodiment of the present disclosure.
FIG. 4 is a simplified block diagram of a table for use in a communication system to allow for prioritized de-queueing in accordance with one embodiment of the present disclosure.

Turning to FIG. 3, FIG. 3 is a simplified tree diagram illustrating example details associated with a communication system 100 to allow for prioritized de-queueing in accordance with one embodiment of the present disclosure. The tree diagram illustrated in FIG. 3 can be based off queue table 120g illustrated in FIG. 2. As illustrated in FIG. 3, reserved queue Q-5 138 is at the top of the tree and is not dependent on any other queues. Reserved queue Q-13 140, reserved queue Q-15 142, reserved queue Q-17 144, and reserved queue Q-19 146 are all dependent from reserved queue Q-5 138. Reserved queue Q-5 138, reserved queue Q-13 140, reserved queue Q-15 142, reserved queue Q-17 144, and reserved queue Q-19 146 can be defined by global queue table 122. In an example, reserved queue Q-5 138, reserved queue Q-13 140, reserved queue Q-15 142, reserved queue Q-17 144, and reserved queue Q-19 146 may not initially be assigned data and as data is received, the data is sent to a queue that is dependent on reserved queue Q-5 138, reserved queue Q-13 140, reserved queue Q-15 142, reserved queue Q-17 144, or reserved queue Q-19 146.

In addition, queue Q-21 148 is dependent from reserved queue Q-13 140. Queue Q-23 150, queue Q-25 152, and queue Q-27 154 are dependent from reserved queue Q-15 142. Queue Q-29 156 and queue Q-31 158 are dependent from reserved queue Q-17 144. Queue Q-32 160 is dependent from queue Q-29 156. Queue Q-21 148, queue Q-23 150, queue Q-25 152, queue Q-27 154, queue Q-29 156, queue Q-31 158, and queue Q-32 160 can be defined by local queue table 124.

Turning to FIG. 4, FIG. 4 is a simplified block diagram of a global queue table 122b for use in a communication system to allow for prioritized de-queueing in accordance with one embodiment of the present disclosure. Global queue table 122b can include a DSCP identifier column 182, a treatment equivalency column 184, a reserved local queue column 186, a dependent on queue column 188, and a queue weight column 190.

DSCP identifier column 182 includes DSCP identifiers that can be existing QoS models that may be associated with a subscription. Each DSCP can be assigned or associated with an individual subscription. The subscriptions can have a portion of the overall bandwidth (bandwidth percentage can be assigned to the reserved queues Q-13, Q-15, Q-17, and Q-19) to help establish dependencies between the subscriptions and achieve a desired prioritization for de-queueing data.

Treatment equivalency column 184 can help identify what type of data is associated with a DSCP identified in DSCP identifier column 182. For example, DSCP 24 can be associated with signaling data. DSCP 0 is a catch all as indicated by the "best effort" description in treatment equivalency column 184. Any data streams that are not marked with a DSCP identifier can be treated as having a DSCP of "0" and assigned to reserved local queue Q-17. Traffic that may not have a DSCP includes non-subscription traffic such as voice over IP, a regular web get, or other data or traffic that is not telemetry data.

Queue weight column 190 includes a weighting factor that can be assigned to the corresponding queue identified in reserved local queue column 186. The weighting factor indicates a percentage of the amount of the weight of all the other queues on the same level of the queue tree or grouping of nodes. The weighting factor allows for proportional de-queueing for queues that are piers reporting to the same parent. As illustrated in FIG. 4, the total queue weight is 120 and "100" means 100 out of the 120 total queue weight and "9" means 9 out of the 120 total queue weight.

Figures 5, 6:
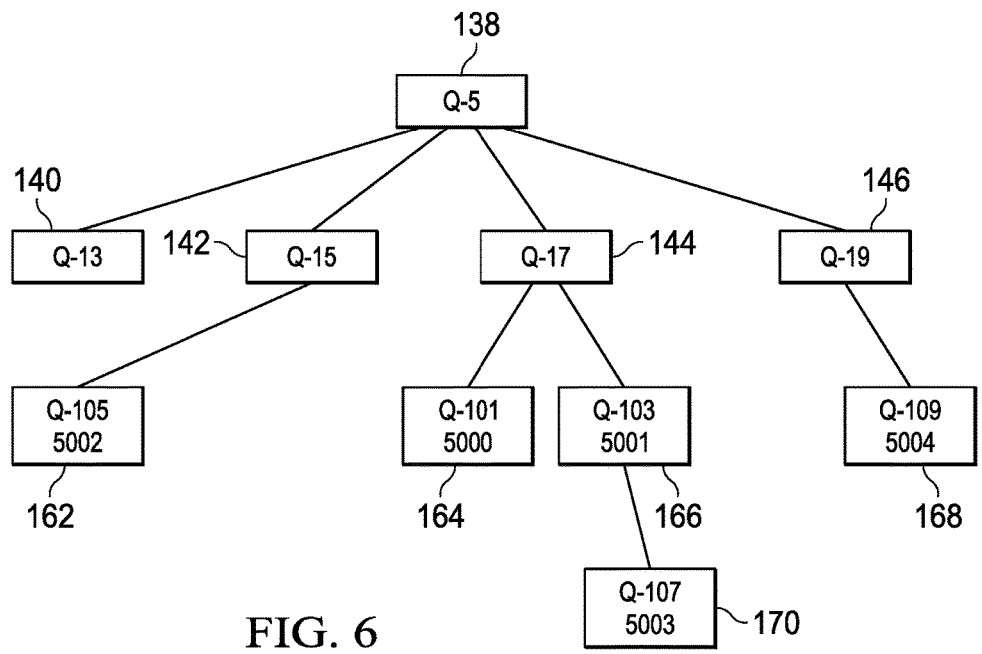
FIG. 5 is a simplified block diagram of a table for use in a communication system to allow for prioritized de-queueing in accordance with one embodiment of the present disclosure.
FIG. 6 is a simplified tree diagram illustrating example details associated with a communication system to allow for prioritized de-queueing in accordance with one embodiment of the present disclosure.

Turning to FIG. 5, FIG. 5 is a simplified block diagram of a local queue table 124h for use in a communication system 100 to allow for prioritized de-queueing in accordance with one embodiment of the present disclosure. Local queue table 124h can include a subscription ID column 192, a DSCP identifier column 194, an allocated queue column 196, a dependent on queue column 198, a dependent queue weight column 200, and a resulting bandwidth column 202.

In an example, data that includes a subscription identifier of 5000, with no DSCP identifier, will be allocated to Q-101 and is dependent from Q-17. Data that includes a subscription identifier of 5001, with no DSCP identifier, will be allocated to Q-103 and is also dependent from Q-17. Each of the data with a subscription identifier of 5000 and 50001 has a dependent stream weight of 10 as indicated by the corresponding entry in dependent on queue column 198. The dependent stream weight of 10 for each data with a subscription identifier of 5000 and 50001 indicates a same level of priority for the data because 50% of the data with a subscription identifier of 5000 and 50% of the data with a subscription identifier of 50001 will be sent to the higher level queue. Subscriptions can be automatically created and deleted and a percentage of bandwidth can be automatically provided so the data can be de-queued appropriately without an administrator having to create any new constructs.

The resulting bandwidth in resulting bandwidth column 202 illustrates what happens when all the queues are full. For example, reserved queue Q-17 144 and dependent queues Q-101 164, Q-103 166, and Q-107 170 it will get 10 out of the 120 proportional bandwidth that has been allocated. Note that the data in queue Q-107 170 will not be sent until queue Q-103 166 is empty as the data in queue Q-103 166 has a higher priority over the data in queue Q-107 170. If a queue empties, then all the other queues will be allocated a proportional amount of the remaining bandwidth. If one queue is full and the other queues are empty, then the full queue, or partially full queue, will get 100% of the bandwidth. If the other queues are not empty, then for Turning to FIG. 6, FIG. 6 is a simplified tree diagram illustrating example details associated with a communication system to allow for prioritized de-queueing in accordance with one embodiment of the present disclosure. The tree diagram illustrated in FIG. 6 can be based off global queue table 122b illustrated in FIG. 4 and local queue table 124h illustrated in FIG. 5. As illustrated in FIG. 6, reserved queue Q-5 138 is at the top of the tree and is not dependent on any other queues. Reserved queue Q-13 140, reserved queue Q-15 142, reserved queue Q-17 144, and reserved queue Q-19 146 are all dependent from reserved queue Q-5 138.

Also, queue Q-105 162 is dependent from reserved queue Q-15 142. Queue Q-101 164 and queue Q-103 166 are dependent from reserved queue Q-17 144. Queue Q-109 168 is dependent from reserved queue Q-19 146. Queue Q-107 170 is dependent from queue Q-103 166. Regarding data related to subscription 5003 in queue Q-107 170, if queue Q-103 166 is not empty or otherwise includes data, then none of the data in queue Q-107 170 is sent. If queue Q-103 166 is empty, then the data in queue Q-107 170 can be sent. The data in queue Q-103 166 has a higher priority than the data in queue Q-107 170 and because queue Q-107 170 depends from queue Q-103 166, the data in queue Q-103 166 will be communicated before the data in queue Q-107 170. Also, the data in queue Q-105 162, which depends from reserved queue Q-15 142 has a higher priority than the data in queue Q-103 166, which depends from reserved queue Q-17 144 because, as illustrated in FIG. 5, queue Q-105 162 depends from reserved queue Q-15 142 and can occupy up to 45% of the total bandwidth while queue Q-103 166 depends from reserved queue Q-17 144 and can occupy 25% of the total bandwidth. In an example, when a specific queue has precedence or a higher priority over other queues, the data in the specific queue that has precedence or a higher priority is fully dequeued before data in other queues is fully dequeued.

Figure 7:
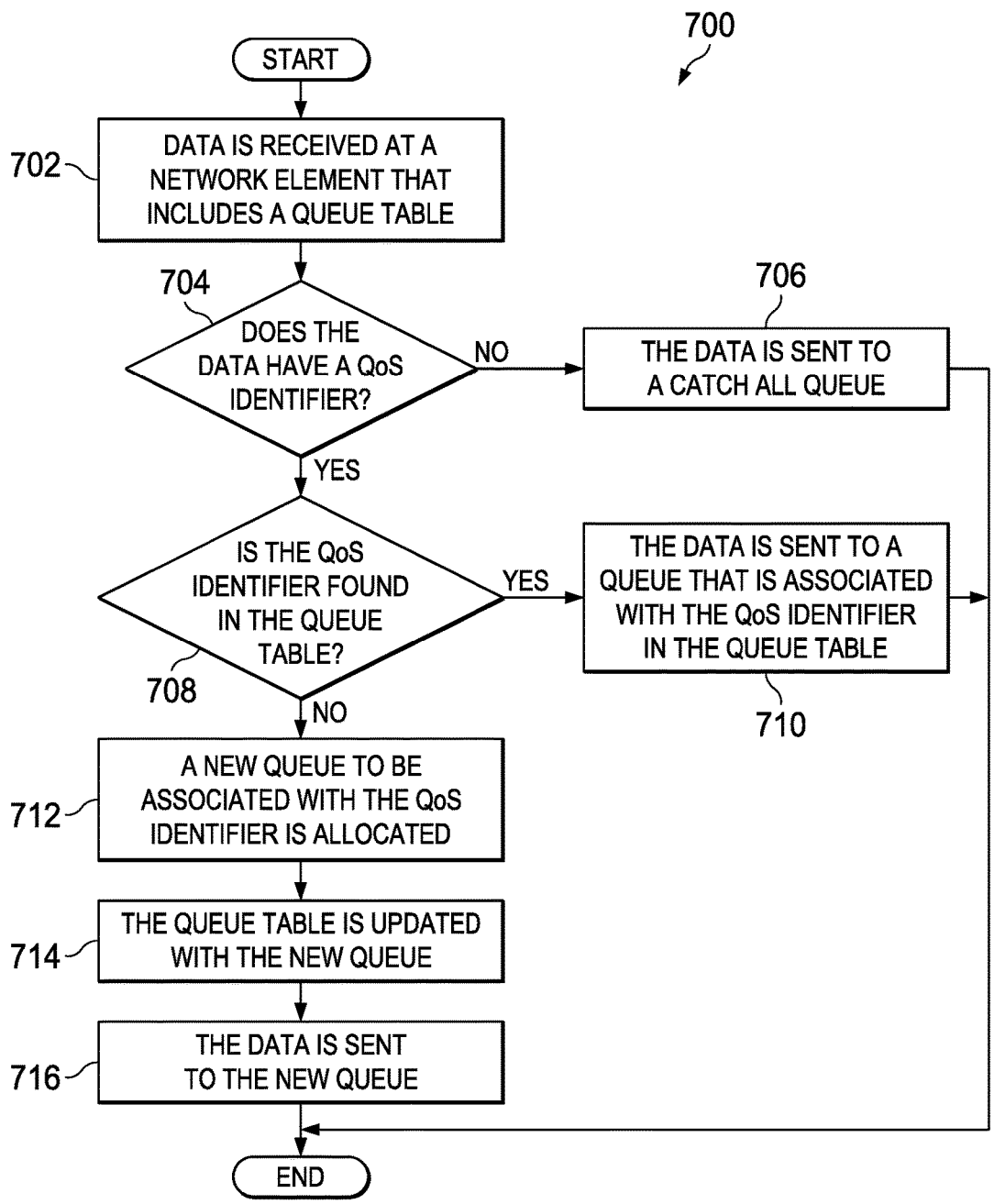
FIG. 7 is a simplified flow diagram illustrating alternative operations associated with the communication system.

Turning to FIG. 7, FIG. 7 is a simplified flow diagram illustrating possible operations of a flow 700 that may be associated with the prioritized de-queueing, in accordance with an embodiment. In an embodiment, one or more operations of flow 700 may be performed by queue engine 118. At 702, data is received at a network element that includes a queue table. At 704, the system determines if the data has a QoS identifier. If the data does not have a QoS identifier, then the data is sent to a catch all queue, as in 706. If the data does have a QoS identifier, then the system determines if the QoS identifier is found in the queue table, as in 708. If the QoS identifier is found in the queue table, then the data is sent to a queue that is associated with the QoS identifier in the queue table, as in 710. If the QoS identifier is not found in the queue table, then a new queue to be associated with the QoS identifier is allocated, as in 712. At 714, the queue table is updated with the new queue. At 716, the data is sent to the new queue. In an example, when data is received with a QoS identifier that is not in the queue table (e.g., queue table 120a) the QoS identifier will include what queue that data should go into and the queue that the queue that data should go into will be dependent from. In another example, when data is not associated with a QoS (e.g., a QoS identifier/DSCP is not provided for a subscription), the default best effort level of 00 can be allocated for the data. In yet another example, if data includes a new unseen QoS, the system can either allocate a new global queue for new unseen QoS, or reuse the best effort queue.

Figure 8:
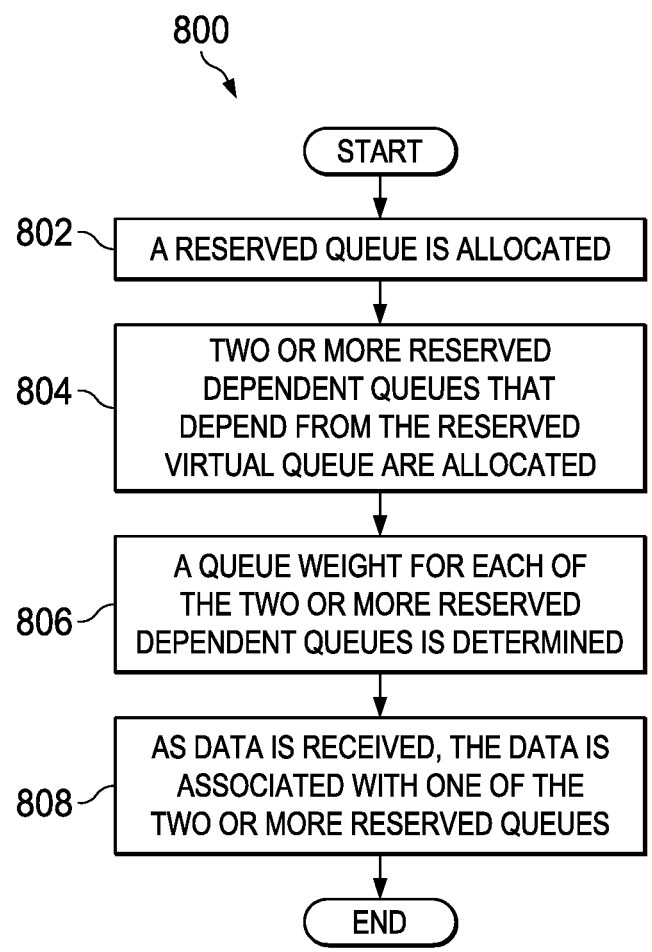
FIG. 8 is a simplified flow diagram illustrating alternative operations associated with the communication system.

Turning to FIG. 8, FIG. 8 is a simplified flow diagram illustrating possible operations of a flow 800 that may be associated with prioritized de-queueing, in accordance with an embodiment. In an embodiment, one or more operations of flow 800 may be performed by queue engine 118. At 802, a reserved queue is allocated. In an example, the reserved queue may be a reserved virtual queue. At 804, two or more reserved dependent queues that depend from the reserved queue are allocated. At 806, a queue weight for each of the two or more reserved dependent queues is determined. At 808, as data is received, the data is associated with one or the two or more reserved dependent queues (e.g., queue Q-21 148, queue Q-23 150, queue Q-25 152, queue Q-27 154, queue Q-29 156, or queue Q-31 158).

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the preceding flow diagrams illustrate only some of the possible signaling scenarios and patterns that may be executed by, or within, communication system 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, communication system 100 may be applicable to other protocols and arrangements. In addition, although communication system 100 has been illustrated with reference to particular elements and operations that facilitate the communication process, these elements and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   allocating a first queue;
   allocating at least two default queues, wherein the at least two default queues depend from the first queue;
   allocating a plurality of local queues that each depend from one of the at least two defaults queues;
   receiving data in a data stream;
   determining a quality of service (QoS) associated with the data; and
   assigning at least a portion of the data to one of the plurality of local queues based on the determined QoS, wherein a specific local queue from the plurality of local queues has a precedence over other local queues that provides that data in the specific local queue is fully dequeued before data in the other local queues is fully dequeued.

2. The method of claim 1, wherein the first queue and the at least two default queues are defined by a global queue table.

3. The method of claim 2, wherein the global queue table includes a weighting factor assigned to each of the at least two default queues.

4. The method of claim 1, wherein the local queues are defined by a local queue table.

5. The method of claim 1, wherein the first queue is a virtual queue.

6. The method of claim 1, wherein the QoS is a differentiated services code point.

7. The method of claim 1, wherein the data is assigned to a catch all queue if the data is not associated with a QoS.

8. The method of claim 1, wherein that data is telemetry data.

9. At least one non-transitory machine readable medium comprising one or more instructions that when executed by at least one processor, cause the at least one processor to:
   allocate a first queue;
   allocate at least two default queues, wherein the at least two default queues depend from the first queue;
   allocate a plurality of local queues that each depend from one of the at least two defaults queues;
   receive data in a data stream;
   determine a quality of service (QoS) associated with the data; and
   assign at least a portion of the data to one of the plurality of local queues based on the determined QoS, wherein a specific local queue from the plurality of local queues has a precedence over other local queues that provides that data in the specific local queue is fully dequeued before data in the other local queues is fully dequeued.

10. The at least one non-transitory machine readable medium of claim 9, wherein the first queue and the at least two default queues are defined by a global queue table.

11. The at least one non-transitory machine readable medium of claim 10, wherein the global queue table includes a weighting factor assigned to each of the at least two default queues.

12. The at least one non-transitory machine readable medium of claim 9, wherein the local queues are defined by a local queue table.

13. The at least one non-transitory machine readable medium of claim 9, wherein the first queue is a virtual queue.

14. The at least one non-transitory machine readable medium of claim 9, wherein the QoS is a differentiated services code point.

15. An electronic device, comprising:
   a memory element configured to store data,
   a processor operable to execute instructions associated with the data, and
   a queue engine configured for:
      allocating a first queue;

allocating at least two default queues, wherein the at least two default queues depend from the first queue;

allocating a plurality of local queues that each depend from one of the at least two defaults queues;

receiving data in a data stream;

determining a quality of service (QoS) associated with the data; and assigning at least a portion of the data to one of the plurality of local queues based on the determined QoS, wherein a specific local queue from the plurality of local queues has a precedence over other local queues that provides that data in the specific local queue is fully dequeued before data in other local queues is fully dequeued.

16. The electronic device of claim 15, wherein the first queue and the at least two default queues are defined by a global queue table.

17. The electronic device of claim 16, wherein the global queue table includes a weighting factor assigned to each of the at least two default queues.

18. The electronic device of claim 15, wherein the local queues are defined by a local queue table.

19. The electronic device of claim 15, wherein the QoS is a differentiated services code point.

20. The electronic device of claim 15, wherein the data is assigned to a catch all queue if the data is not associated with a QoS.

* * * * *